(12) United States Patent
Lathrop et al.

(10) Patent No.: US 9,333,983 B2
(45) Date of Patent: May 10, 2016

(54) DUAL-STATE STEERING WHEEL/INPUT DEVICE

(71) Applicants: Volkswagen AG, Wolfsburg (DE); Audi AG, Ingolstadt (DE)

(72) Inventors: William Brian Lathrop, San Jose, CA (US); James Leigh Toggweiler, San Francisco, CA (US); Erik Robert Glaser, San Francisco, CA (US); Nathaniel Robert Coser, Palo Alto, CA (US); Bryan Grant, Palo Alto, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 30 days.

(21) Appl. No.: 13/915,096

(22) Filed: Jun. 11, 2013

(65) Prior Publication Data

US 2014/0277896 A1 Sep. 18, 2014

Related U.S. Application Data

(60) Provisional application No. 61/792,239, filed on Mar. 15, 2013.

(51) Int. Cl.
*B62D 1/04* (2006.01)
*G05D 1/00* (2006.01)
*B62D 1/06* (2006.01)
*B62D 1/28* (2006.01)
*B60K 37/06* (2006.01)

(52) U.S. Cl.
CPC . *B62D 1/04* (2013.01); *B60K 37/06* (2013.01); *B62D 1/046* (2013.01); *B62D 1/06* (2013.01); *B62D 1/286* (2013.01); *B60K 2350/928* (2013.01); *Y10T 74/20256* (2015.01)

(58) Field of Classification Search
CPC ............ B62D 1/28; B62D 1/046; B62D 1/04; B60K 31/0008; B60K 35/00
USPC ...................... 701/21, 23, 25, 26, 36, 45, 423; 345/156, 158
See application file for complete search history.

(56) References Cited

U.S. PATENT DOCUMENTS

| | | | | |
|---|---|---|---|---|
| 5,684,696 A | * | 11/1997 | Rao ..................... | B60K 31/0008 318/587 |
| 7,126,583 B1 | * | 10/2006 | Breed ..................... | B60K 35/00 345/158 |
| 7,680,574 B2 | * | 3/2010 | Berg ...................... | B60K 35/00 345/173 |
| 7,793,980 B2 | * | 9/2010 | Fong ...................... | B62D 1/197 280/775 |
| 7,894,951 B2 | * | 2/2011 | Norris .................. | G05D 1/0246 180/443 |
| 8,025,581 B2 | * | 9/2011 | Bryan ...................... | G05G 7/02 463/2 |
| 8,078,338 B2 | * | 12/2011 | Pack ..................... | G05D 1/0061 701/1 |

(Continued)

*Primary Examiner* — Thomas G Black
*Assistant Examiner* — Wae Louie
(74) *Attorney, Agent, or Firm* — Muncy, Geissler, Olds & Lowe, P.C.

(57) ABSTRACT

A steering wheel is configured as a dual-state input device configured to operate in two distinct states based on a current driving mode. In a manual driving mode, the input device is configured to control a limited set of vehicle functions and in an autonomous mode the input device is configured to control an expanded set of vehicle functions. The steering wheel includes a wheel rim movably mounted on a steering column and a hub disposed within a center of the wheel rim on the steering column, the main body portion comprising an interactive touch screen disposed on the main body portion. The wheel rim is configured to disengage from the hub and move along the steering column to a retracted position.

20 Claims, 13 Drawing Sheets

(56) References Cited

U.S. PATENT DOCUMENTS

| | | | | |
|---|---|---|---|---|
| 8,126,642 B2* | 2/2012 | Trepagnier | ............ | G01S 17/023 180/167 |
| 8,160,760 B2* | 4/2012 | Lenneman | ............ | B60R 16/005 180/170 |
| 2006/0155441 A1* | 7/2006 | Berg | ............ | B60K 35/00 701/41 |
| 2006/0284839 A1* | 12/2006 | Breed | ............ | B62D 1/046 345/156 |
| 2007/0282506 A1* | 12/2007 | Breed | ............ | B60N 2/028 701/45 |
| 2011/0153160 A1* | 6/2011 | Hesseling | ............ | B60K 35/00 701/41 |
| 2012/0083964 A1* | 4/2012 | Montemerlo | ............ | G05D 1/0214 701/26 |
| 2012/0173067 A1* | 7/2012 | Szczerba | ............ | G02B 27/01 701/23 |
| 2013/0002416 A1* | 1/2013 | Gazit | ............ | B62D 1/28 340/438 |

* cited by examiner

DUAL-STATE STEERING WHEEL/INPUT DEVICE

This nonprovisional application claims priority to U.S. Provisional Application No. 61/792,239, which was filed on Mar. 15, 2013, and which is herein incorporated by reference.

BACKGROUND OF THE INVENTION

1. Field of the Invention

The present invention relates to vehicle steering wheel devices and, more particularly, to a dual-state steering wheel for use in a manual driving mode and an autonomous driving mode.

2. Description of the Background Art

As vehicles' driver assistance systems gain in complexity and approach, semi-autonomous capability, it is increasingly vital that the driver of such a vehicle be aware of the current autonomous system state. As with existing semi-autonomous vehicles, such as commercial airliners, the most common cause of accidents in semi-autonomous automobiles will likely be some form of mode confusion. Confusion about what driving mode the vehicle is in (autonomous or manual) may lead the driver to believe that the driver is not responsible for driving when the driver actually is responsible. To solve this increasingly threatening problem, control surfaces and information displays within the vehicle cockpit must offer a quick and easy method to indicate the current vehicle state. That is, the vehicle cockpit must confirm when the driver is responsible for operating the vehicle and confirm when the driver is not responsible, but keep the driver "in-the-loop" at all times.

Another problem in the realm of semi-autonomous vehicles is the legal question surrounding the operation of the vehicle. Specifically, the issue of who is at fault should an accident occur when the vehicle is in any form of autonomous mode. Specifically, whether the drivers or the developers of the system would be at fault. From the perspective of those behind the production of the vehicle, it is important that the driver maintain responsibility for the operation of the vehicle.

The idea of collapsible steering columns has been in existence and has even been implemented in production vehicles. The purpose of the collapsible steering columns has been to allow adjustability in order to achieve the ideal distance between steering wheel and driver, prevent the driver from being impaled by a rigid steering column in the event of a head-on collision, and provide easier access to the driver's seat by retracting the steering wheel when the car is off.

Figure 1A:
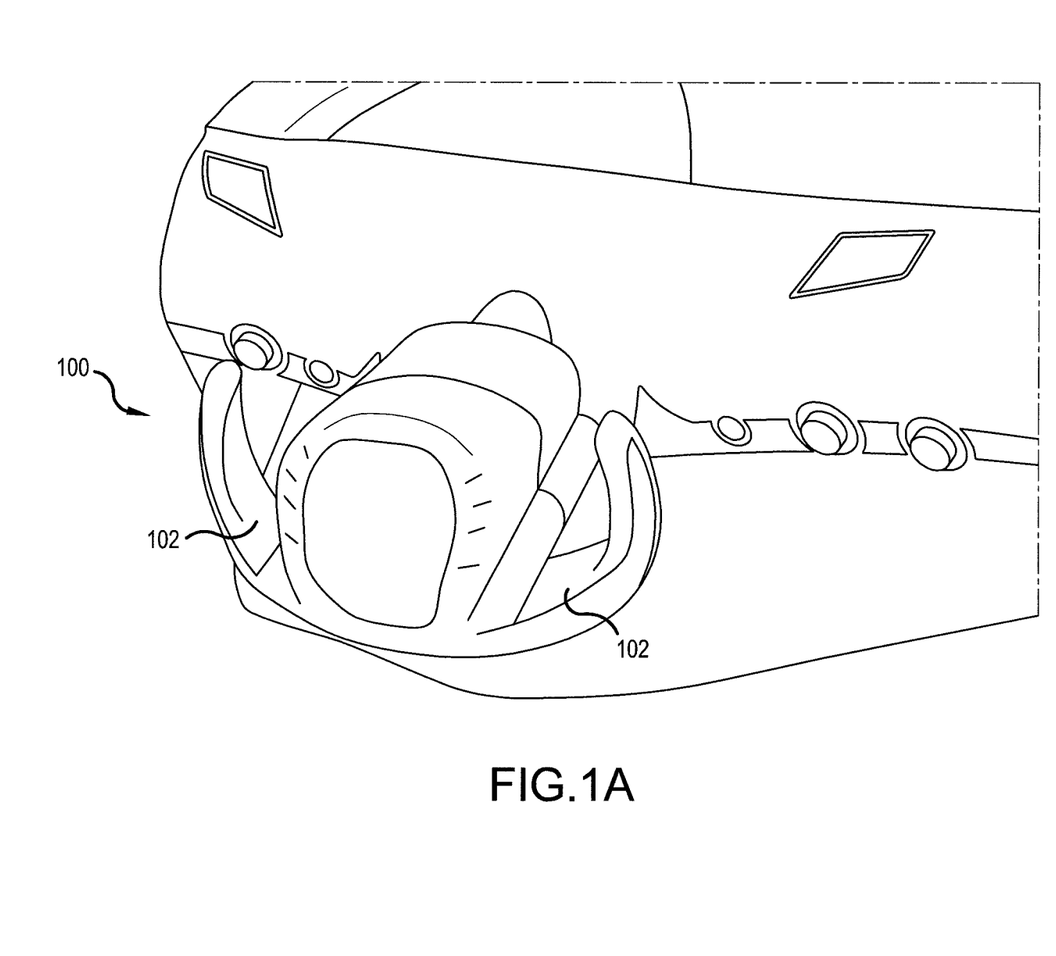
FIGS. 1A and 1B illustrate a steering wheel according to a first conventional design.
Figure 1B:
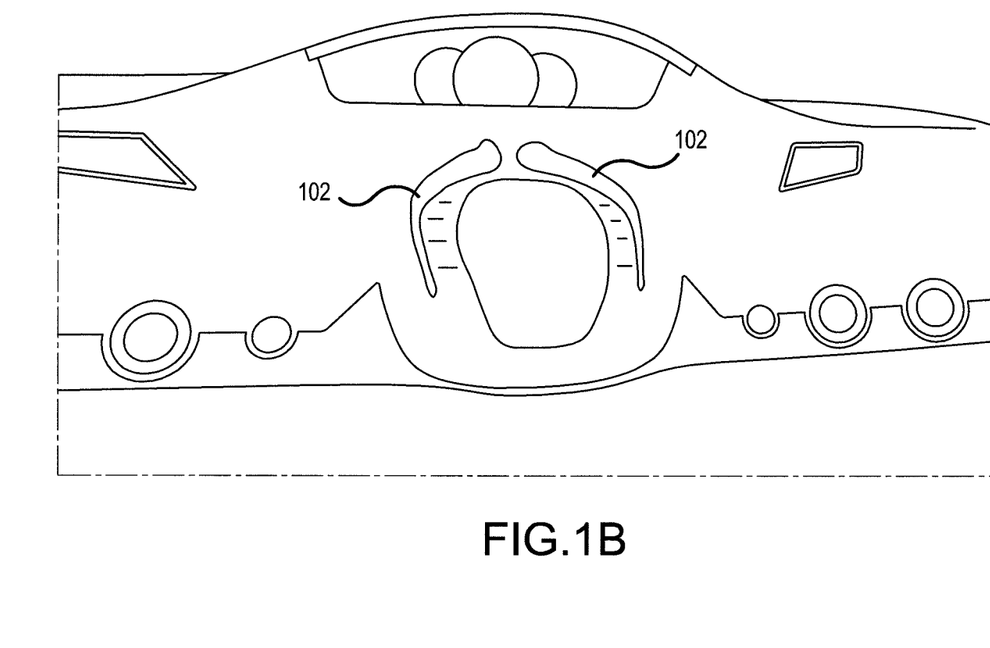

One recent design concept takes this last application a step further. The concept explores the idea of a collapsible/retractable steering wheel/column, which allows the steering wheel and column to completely recede into the dashboard, allowing easier access to the vehicle interior, especially in small vehicle cockpits. FIGS. 1A and 1B illustrate this design concept. FIG. 1A illustrates the retractable steering wheel 100 concept in its normal operating mode. The conventional steering wheel rim is replaced by yoke-like handles 102 on either side of the central hub. FIG. 1B illustrates the retractable steering wheel in its off state. In the off state, the two steering yokes 102 fold in, mating with the surface of the central hub. The entire unit then recedes backwards until it sits flush with the surface of the dashboard.

Figure 2A:
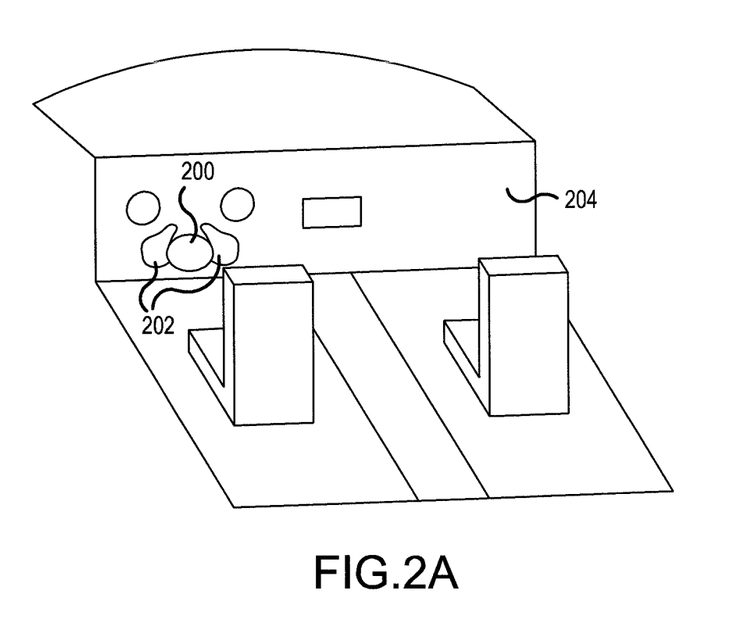
FIGS. 2A and 2B illustrate a steering wheel according to a second conventional design.
Figure 2B:
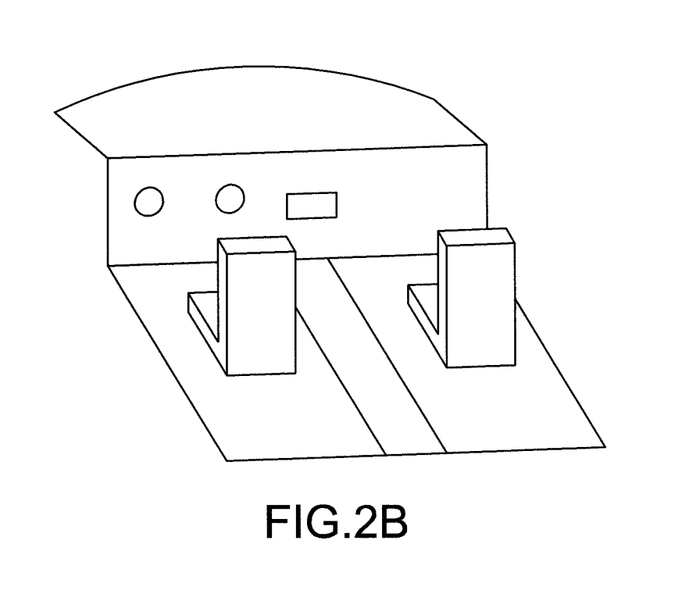

A similar concept is illustrated in FIGS. 2A and 2B and includes a retractable/disappearing steering wheel in the context of an autonomous vehicle. In this system, another yoke-like steering wheel collapses and recedes into the dashboard when the vehicle enters the autonomous mode. While the transforming steering controls in this case do inevitably serve to indicate an autonomous mode change, the controls neither retain nor gain any functionality in their autonomous mode state. The purpose for the control transformation then, is to again provide more room for the driver in a situation where the driver has reduced responsibility and can take advantage of that opportunity to relax and rest. To further facilitate relaxation, the retracting of the steering controls is coupled with a reclining of the front seats and the appearance of a small ottoman from underneath the front of the seats. FIG. 2A illustrates the steering wheel 200 in its normal driving state. The yoke-like steering controls 202 are presented to the driver as they would be in a conventional vehicle interior. FIG. 2B illustrates the steering wheel after entering the autonomous driving mode. The steering yoke controls 202 have been retracted and integrated into the form of the dashboard 204.

The steering yoke serves as a symbol of the driver's ability and responsibility to operate the vehicle. When the wheel is present, the driver must drive. When the wheel is gone, the driver cannot drive. It does not serve as a symbol of the vehicle's ability or responsibility to operate itself.

Figure 3:
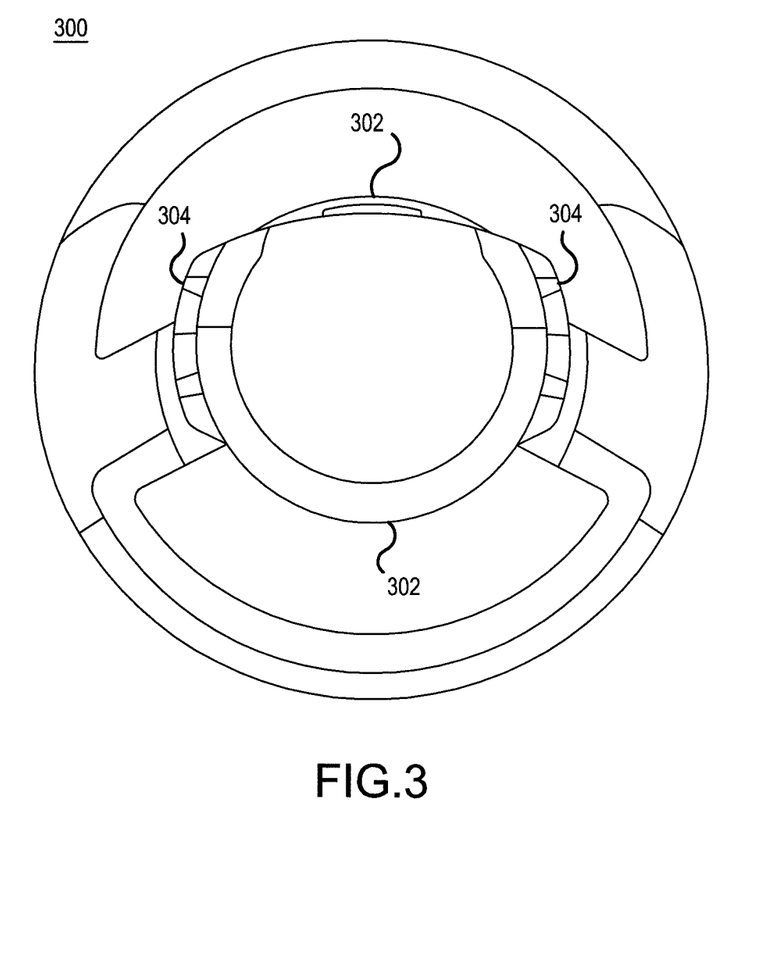
FIG. 3 illustrates a steering wheel according to a third conventional design.

FIG. 3 illustrates another conventional design 300 featuring a steering wheel hub 302 containing the airbag and all steering wheel mounted controls 304 that does not turn with the rim of the wheel. By adding controls to the traditionally unutilized real estate on the steering wheel, buttons can be removed from the typically clustered dashboard, buttons can be more easily accessed and grouped in their static location, and airbags can be designed more effectively if the angle at which the airbag deploys is known and never changes. While the wheel hub and rim never disengage in the sense that they actually move away from each other, they are disengaged in the sense that they do not turn together.

Furthermore, U.S. Patent Application Publication No. 2013/0002416 discloses a steering wheel configured to operate in a manual mode and an autonomous mode. The steering wheel is moveable from a first position to a second position, which sends a signal to an autonomous driving electronic control unit (ECU) and engages the ECU to enter the autonomous driving mode. In order to reinitiate manual driving mode, the user merely grasps the steering wheel. There are no input controls associated with the steering wheel.

There are currently no conventional steering wheel devices, operating as dual-state input devices, that successfully disambiguate between autonomous and manual driving modes while encouraging the driver to keep his/her hands on the steering wheel at all times.

SUMMARY OF THE INVENTION

In view of the foregoing and other exemplary problems, drawbacks, and disadvantages of the conventional methods and structures, an exemplary feature of the method and system of the present invention is to provide a steering that is able to operate as dual-state input device in a manual driving mode and in an autonomous driving mode and that clearly identifies to the driver the current driving mode, while encouraging the driver to keep his/her hands on the steering wheel at all times.

In accordance with a first exemplary, non-limiting aspect of the present invention, a steering wheel includes a wheel rim movably mounted on a steering column, a hub disposed within a center of the wheel rim on the steering column, and an input device disposed on the hub. The wheel rim is configured to disengage from the hub and move along the steering column to a retracted position.

In accordance with a second exemplary, non-limiting aspect of the present invention, a steering wheel includes a dual-state input device configured to operate in two distinct states based on a current driving mode. In a manual driving mode the input device is configured to control a limited set of vehicle functions and in an autonomous mode the input device is configured to control an expanded set of vehicle functions.

In accordance with a third exemplary, non-limiting aspect of the present invention, a steering wheel includes a retractable steering tube, a wheel rim movably mounted on the steering tube, a hub mounted within the wheel rim on a stationary tube, the stationary tube extending from the retractable steering tube, an input disposed on the hub, and an actuator configured to retract and extend the retractable steering tube. The wheel rim is configured to disengage from the hub and move to a retracted position in response to the steering wheel entering an autonomous driving mode.

The current invention introduces a transforming input device (e.g., steering wheel) that has two distinct states directly linked to the current driving mode of the vehicle. In the first state, the driver is presented with a conventional steering wheel with which to steer the vehicle and manipulate common infotainment features such as, for example, audio volume. Upon entering the second state, when the vehicle enters the autonomous mode, the steering wheel rim disengages from the rest of the steering wheel mechanism and moves away from the driver, while the controls traditionally located on the spokes of the steering wheel move towards the driver. While the vehicle turns during autonomous operation, the steering wheel rim turns as well while in the retracted position. The controls, now in front of the driver and no longer rotating with the rest of the steering wheel, offer expanded infotainment interaction, facilitated by a set of fully programmable touch screens.

In this way, the control surfaces suggest that the vehicle's autonomous system has just entered a distinctly different state, the driver is no longer responsible for steering the vehicle, which the vehicle is now controlling autonomously, and the driver is free to interact with the vehicle's infotainment system on a deeper level not appropriate during normal driving. Each of these easily-recognizable traits of the system state reduce or eliminate mode confusion. Furthermore, besides disambiguating between autonomous states and, thereby, decreasing the chances of mode confusion-related accidents, the transforming steering controls of the present invention encourage the driver to keep his/her hands on the steering wheel at all times.

In comparison with the conventional systems, which aim to make the steering wheel disappear completely in an effort to expand cabin space, the steering control transformation of the present invention is designed to serve as indication of a vehicle state change and to keep the driver "in-the-loop." Furthermore, with the wheel rim in its retracted position, the steering wheel, the symbolic representation of vehicle control, can be observed controlling the vehicle on its own (i.e., being controlled by various onboard computers). The synced motion of the wheel rim and vehicle maneuvers reinforces the idea that the car is in control of itself and that, when back in the user's hands, the steering wheel will give the driver complete control of the vehicle again.

Furthermore, some of the described conventional methods (e.g., as illustrated in FIGS. 1A/1B and 2A/2B) are dual state in that they transform between being present and absent/concealed. Thus, they have one state in which the steering wheel can be used and one state in which the steering wheel cannot be used. Therefore, as an input device, the steering wheel can only be considered to have one state.

In the present invention, however, the controls transform physically in order to expand or reduce the actual functionality of the steering wheel as an input device to more appropriately address the needs and abilities of the driver between each state. In manual driving mode, the driver is offered only standard steering wheel-located controls, like those for audio, cruise control, navigation, and voice control. The graphics being displayed on the two touch screens are static and are interacted with through simple one-click button presses with the thumbs. In the autonomous mode, the backward movement of the wheel rim allows the user's fingers to access to the surfaces directly adjacent and behind the touch screens. An increase in complexity of graphics and interaction offers users access to on board applications that require and allow more focus than those available during manual operating mode and, in doing so, keep the driver entertained and productive throughout the autonomous portion of their drive. In functioning as a different input device in both modes, the current steering wheel/input device can be considered a dual-state input device and is, therefore, distinctly different than the conventional systems.

Moreover, a problem with some of the conventional systems, especially the system illustrated in FIGS. 2A/2B, is that the manufacturer of the product is at great legal risk. That is, should the vehicle be involved in an accident while in the autonomous mode, only the manufacturer could be found responsible as the driver of the vehicle has no means of taking back control of the vehicle in an emergency.

The current steering wheel configuration of the present invention allows the driver to immediately take back control of the vehicle by simply reaching forward and grabbing the steering wheel rim. Furthermore, by directing the focus of the driver forward and towards the steering wheel input device at all times, the current invention prioritizes keeping the driver "in-the-loop" during the autonomous mode, rather than keeping the driver relaxed, so that the driver is cognitively prepared for responding to an emergency, should one occur. Whether the driver or the vehicle itself recognizes the possibility of an emergency (e.g., accident), control of the vehicle can immediately be given back to, or taken back by, the driver, who would then be responsible for avoiding the collision in an appropriate manner.

Finally, the conventional steering wheel configuration illustrated in FIG. 3, which includes a steering wheel whose rim and spokes rotate around a fixed hub, includes many possible pinch-points where fingers could be caught between the two pieces as they rotate in relation to each other. To avoid this possibility, the controls were placed farther from the rim of the wheel, such that the user would have to stretch his/her thumb farther to reach the buttons, or remove a hand from the wheel rim completely in order to press the buttons on the hub.

Because all the controls and steering surfaces of the current invention remain in the conventional positions, all the electronic functions of the steering wheel can be accessed quickly, easily, and safely during manual driving. In the autonomous mode, the wheel rim rotates far enough behind the stationary wheel hub to eliminate the possibility of any pinch-points. In order to eliminate any further pinch-points when the wheel rim and hub join back together, the touch screens are mounted to each side of the hub on spring-loaded hinges. Should a finger remain behind one of the touch screens while the spokes close over the touch screen, the touch screen swings forward, allowing space for the finger between the two surfaces and avoiding injury.

According to certain exemplary aspects of the invention, a steering wheel is adapted into a dual-state input device, where one state is used in the context of manual driving and allows limited use of electronic features of the vehicle and the second state is used in the context of autonomous driving and allows expanded infotainment interaction. In use, the steering wheel splits in two, the wheel rim drops back, and the wheel hub moves forward. The wheel rim serves as an indication of autonomous capability as it turns in its retracted position. The physical transformation and coinciding graphics change, limit, and expand interactive features between modes. The design of the system keeps the driver in a position of responsibility at all times. Lastly, spring loaded hinges help prevent pinch points when wheel parts mate back together. Accordingly, besides disambiguating between autonomous and manual driving modes and, thereby, decreasing the chances of mode confusion-related accidents, the transforming steering controls encourage the driver to keep his/her hands on the steering wheel at all times.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, do not limit the present invention, and wherein.

DETAILED DESCRIPTION

Referring now to the drawings, and more particularly to FIGS. 4-12, there are shown exemplary embodiments of the method and structures according to the present invention.

Figure 4:
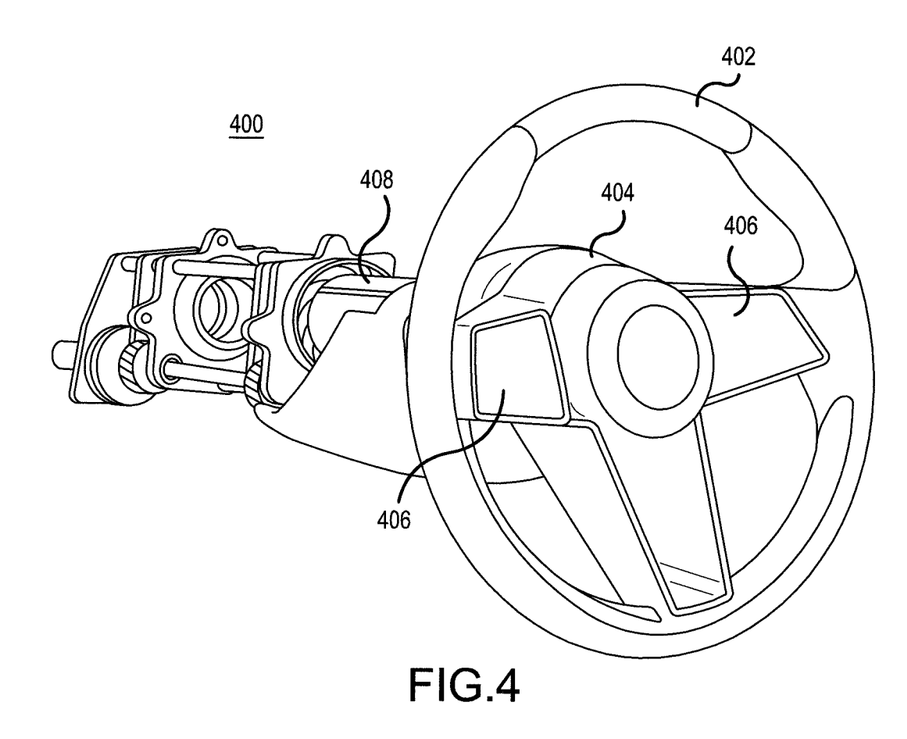
FIG. 4 illustrates a steering wheel 400 according to certain exemplary embodiments of the present invention.
Figure 5:
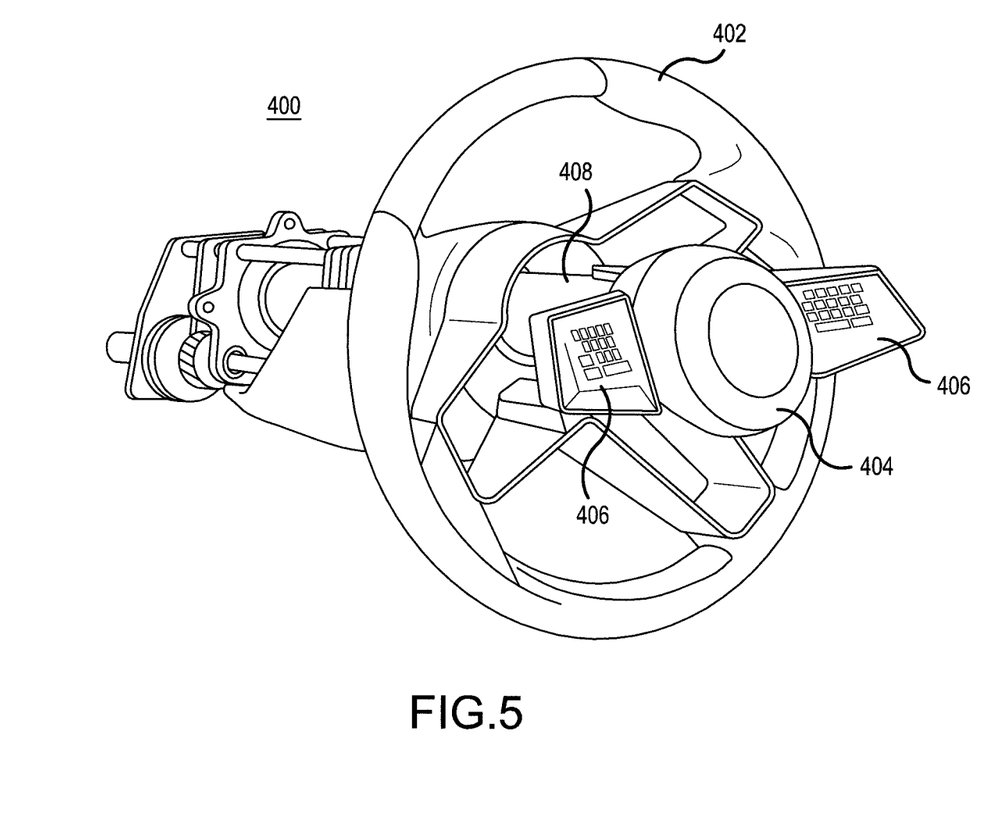
FIG. 5 illustrates the steering wheel 400 of FIG. 4 in an autonomous mode.

FIGS. 4 and 5 illustrate a steering wheel 400 according to certain exemplary embodiments of the present invention. The steering wheel 400 is configured to operate as a transformable, dual-state input device. The steering wheel 400 has two distinct operating states directly linked to a current driving mode of the vehicle. In a first state, which corresponds to a manual vehicle driving mode, the steering wheel 400 is presented as a conventional steering wheel. The steering wheel 400 includes a wheel rim 402 and a main body portion (i.e., central hub) 404 positioned within the wheel rim 402. The wheel rim 402 is a physically separable component from the central hub 404 and is slidably mounted along a steering column 408. The central hub 404 is mounted to an end of the steering column 408.

The steering wheel 400 includes one more input controls 406 mounted on the central hub 404. In the embodiment illustrated in FIG. 4, the input controls 406 include touch screen panels mounted on each side of the central hub 404. While the vehicle is in the manual driving mode and the steering wheel 400 is in the corresponding manual operating state, the input controls 406 are limited to controlling only a limited set of common controls (e.g., volume control, radio station control, etc.).

Upon entering the second state, as is illustrated in FIG. 5, which corresponds to the autonomous vehicle driving mode, the steering wheel rim 402 disengages from the steering wheel hub 404 and moves away from driver along the steering column 408. The central hub 404 and the input controls 406 move toward the driver. The steering wheel rim 402, while in the retracted position illustrated in FIG. 5, is configured to turn along with a turning motion of the vehicle (i.e., automatically turn without input/control from the driver), in an effort to clearly identify that the vehicle is operating in the autonomous mode. The central hub 404 and the input controls 406 remain stationary and do not rotate along with the steering wheel rim 402.

The input controls 406, while in the autonomous driving mode, are configured to provide an expanded set of user input options and include a fully-programmable touch screen on each side of the central hub 404. The touch screens may include an alphanumeric control panel and/or additional control menus and icons, which may be configured to control any function within the vehicle (e.g., navigation system, radio, video, climate control, connected mobile device, etc.). The expanded input controls 406 and the retracted steering wheel rim 402 suggest the vehicle's driving system has entered the autonomous driving mode and that the driver is free to interact with the vehicle's infotainment system on a deeper level than is not appropriate during manual driving. These easily-recognizable traits reduce and/or eliminate vehicle operating mode confusion.

Specifically, the controls 406 transform physically in order to expand or reduce the actual functionality of the steering wheel as an input device to more appropriately address the needs and abilities of the driver between each state. In manual driving mode, the driver is offered only standard steering wheel-located controls, like those for audio, cruise control, navigation, and voice control. The graphics being displayed on the two touch screens 406 are static and are interacted with through simple one-click button presses with the thumbs. In the autonomous mode, the backward movement of the wheel rim 402 allows the user's fingers to access to the surfaces directly adjacent and behind the touch screens 406. Graphics and interactions having increased complexity are provided to the driver in the autonomous mode. The increase in complexity of graphics and interaction offers users access to on board applications that require and allow more focus than those available during manual operating mode and, in doing so, keep the driver entertained and productive throughout the autonomous portion of their drive.

Figure 6:
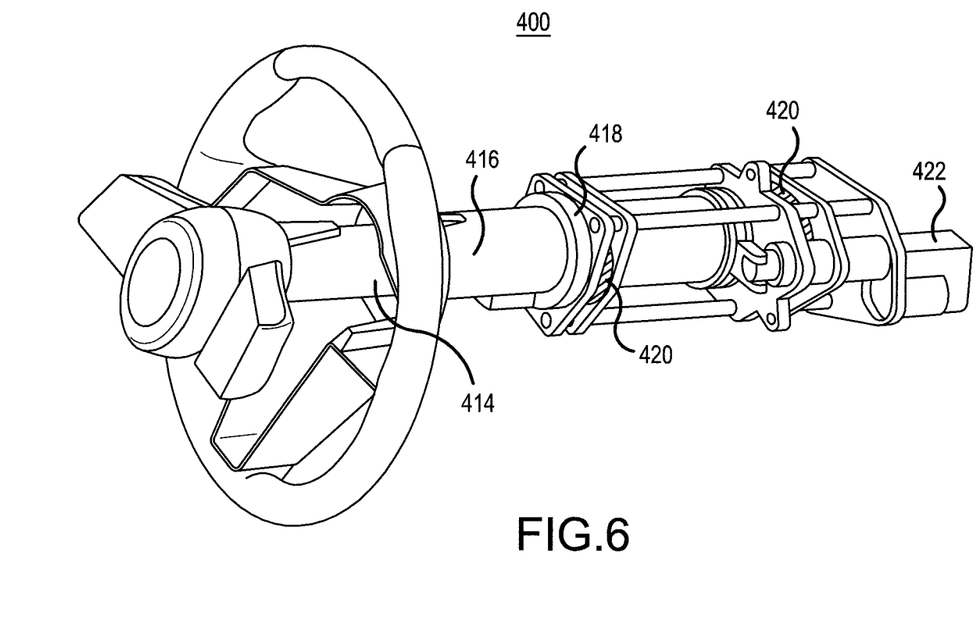
FIG. 6 illustrates an alternate view of the steering wheel 400 illustrated in FIG. 4.
Figure 7:
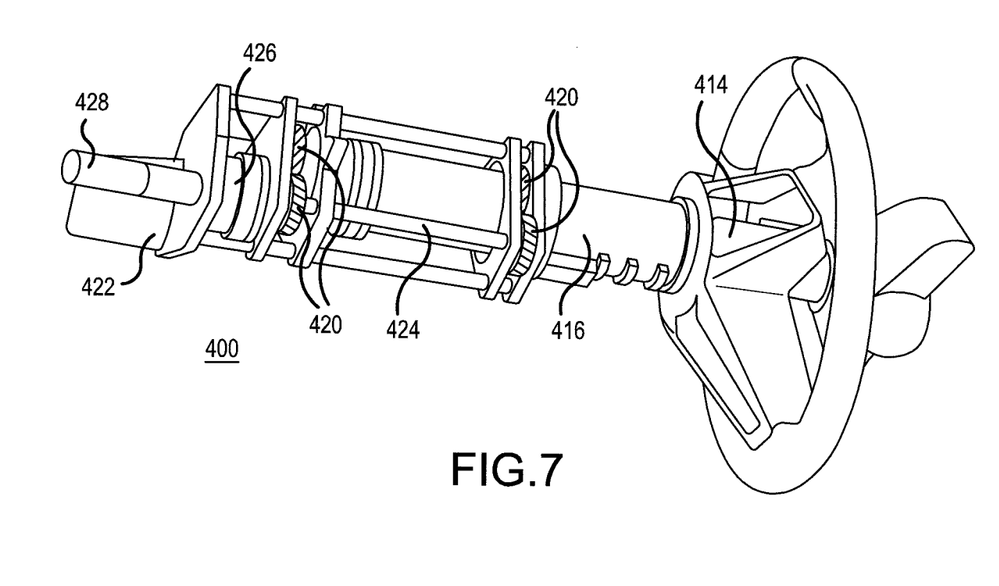
FIG. 7 illustrates another alternate view of the steering wheel 400 illustrated in FIG. 4.
Figure 8:
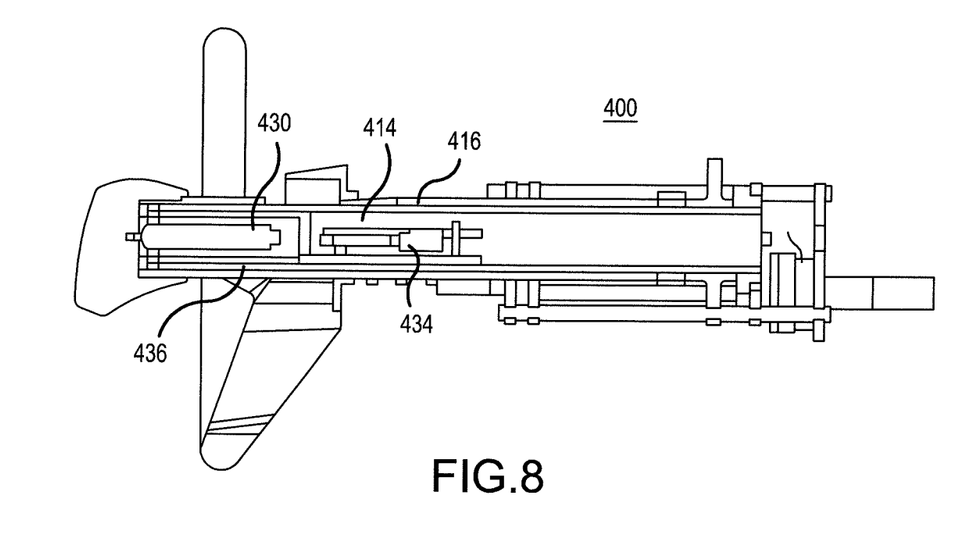
FIG. 8 illustrates a sectional view of the steering wheel 400 illustrated in FIG. 4.

FIGS. 6-8 further illustrate the detail of the structure of the steering wheel assembly 400. The steering wheel is mounted on a support shaft 414. Specifically, the central hub 404 is mounted on an end of and supported by the support shaft 414. An outermost tube 416 is concentrically mounted on the support shaft 414. The steering wheel rim 402 is mounted on the outermost tube 416. The outermost tube 416 is configured to slide along the support shaft 414 to move the steering wheel rim 402 from the initial, conventional position (e.g., FIG. 4), to the retracted position (e.g., FIG. 5). An actuator (e.g., a four-inch linear actuator) 422 is configured to retract and extend the outermost tube 416 back and forth along the support shaft 414. The support shaft 414 remains stationary and provides support for the entire steering wheel assembly 400. The support shaft 414 and the outermost steering tube 416 (along with the inner tube 436, described below) constitute the steering column 408.

A smaller (e.g., smaller than the outermost tube 416) drive shaft 424 is disposed between the actuator 422 and the outermost tube 416. A plurality of helical gears 420 are disposed at each end of the drive shaft 424. In the manual driving mode, the rotational motion of the steering wheel (i.e., the driver's steering maneuvers) is transferred from the wheel rim 402 and outermost steering tube 416 to the vehicle's steering actuator via the plurality (e.g., four) of helical gears and the drive shaft 424, which is positioned adjacent and along side the steering column 408.

In the autonomous mode, an electro-magnetic clutch 426 is engaged that allows the outermost tube 416 to be driven by a motor 428 located towards the rear of the system adjacent the actuator 422. The inner tube 436, which is smaller in diameter than the outermost tube 416 and the support shaft 414, is located inside the support shaft 414. The inner tube 436 is configured to be retracted and extended by a second, smaller, linear actuator 434, which is also positioned within the support shaft 414. A motor 430 located inside the inner tube 436 is configured to change the angle of the hub 404 when the wheel rim 402 and the hub 404 mate together during a turn, in which case the hub 404 will need to rotate to the angle of the wheel rim 402 to mate correctly.

Figure 9:
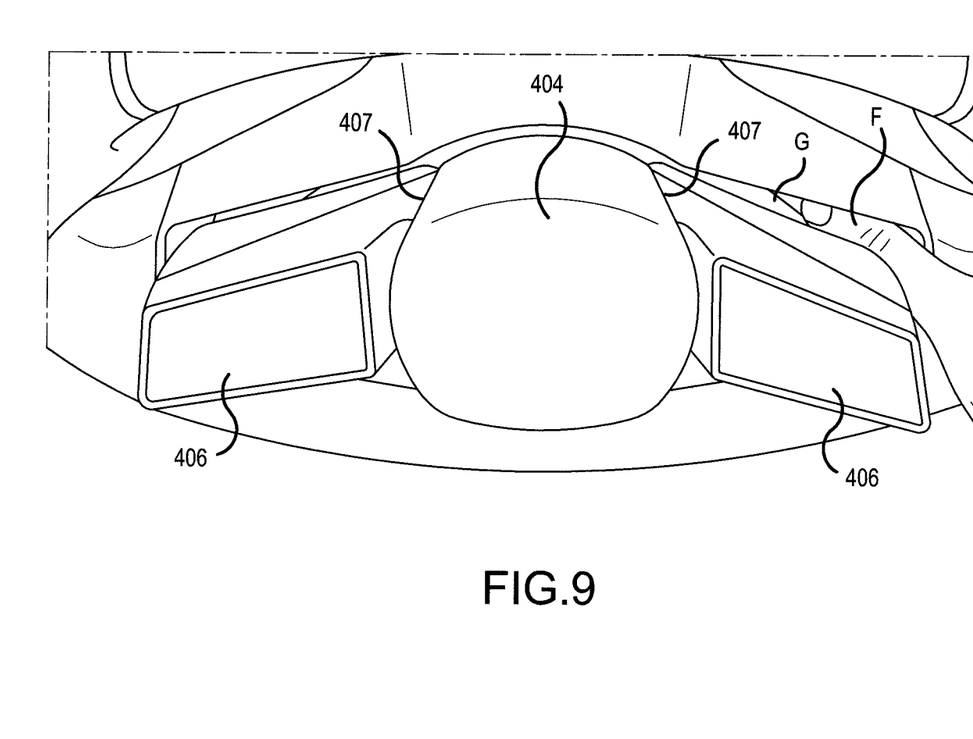
FIG. 9 further illustrates the configuration of the input controls 406 on the central hub 404.

FIG. 9 further illustrates the configuration of the input controls 406 on the central hub 404. The input controls 406 are mounted on either side of the central hub 404 of the steering wheel 400. The input controls 406 are mounted using spring-loaded hinges 407. If the wheel rim 402 and the central hub 404 should close (i.e., return to manual driving mode) while the user's fingers remain behind the input controls 406, then the hinge's spring compresses, allowing a gap G large enough to fit a finger F to remain between the central hub 404 and the input controls 406.

Figure 10:
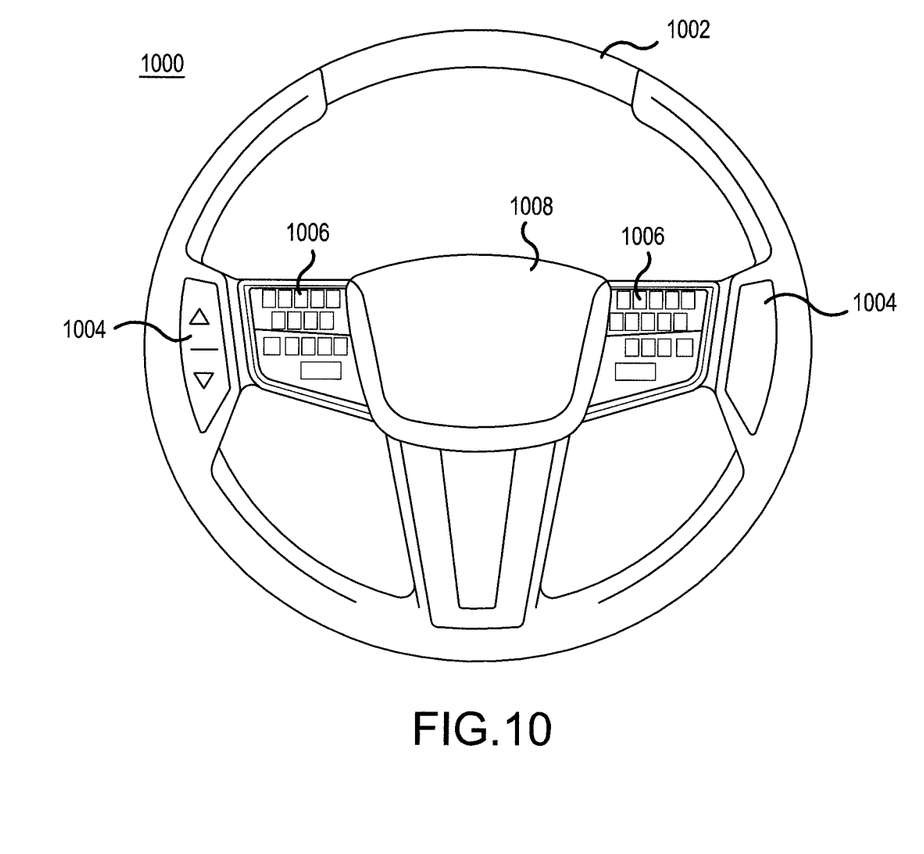
FIG. 10 illustrates a steering wheel 1000 according to an alternative embodiment of the present invention.

FIG. 10 illustrates an alternative embodiment of the steering wheel 1000. The steering wheel 1000 includes a conventional steering wheel divided into two input devices: one device for steering and one for infotainment interaction. Input buttons (e.g., capacitive buttons) 1004 are positioned on the steering wheel rim 1002 and are configured to control common steering wheel-mounted infotainment features (e.g., volume control). Touch screens 1006 are located on each side of the wheel hub 1008 and configured to display information indicating the availability of the autonomous system during manual driving mode. Furthermore, during autonomous driving mode, the touch screens 1006 are configured to allow expanded infotainment interaction. In the alternative embodiment illustrated in FIG. 10, the configuration of the controls on the touch screens 1006 changes depending on the driving mode. As in the previous embodiments, the rim retracts so that the structural configuration of the steering wheel is different for manual mode and the autonomous mode.

Figure 11:
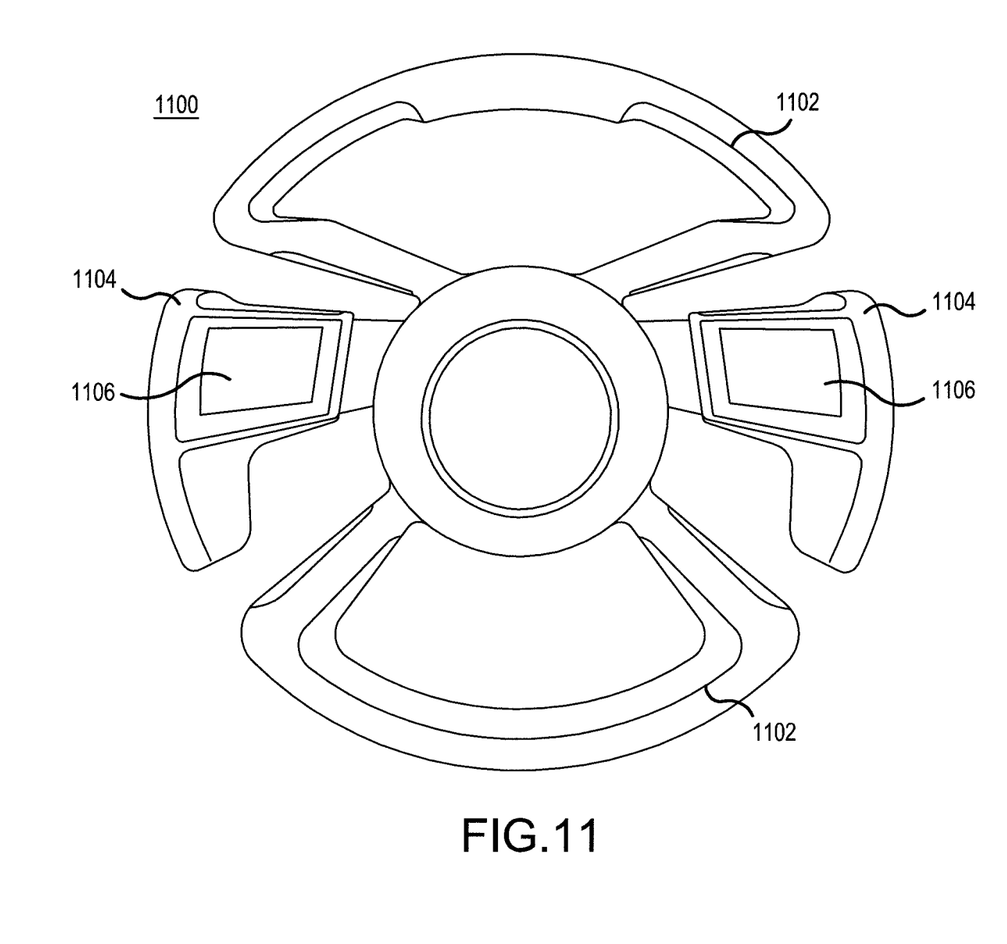
FIG. 11 illustrates a steering wheel 1100 according to an alternative embodiment of the present invention.

FIG. 11 illustrates another alternative embodiment of the steering wheel 1100. The steering wheel 1100 has a split configuration with upper and lower wheel rim portions 1102 and two steering yolk portions 1104 disposed between the upper and lower wheel rim portions 1102 and positioned on either side of the central hub 1108. Interactive touch screens 1110 are disposed on the yolk portions 1104.

During the autonomous driving mode, the yoke portions 1104 remain in the forward position along with the central hub 1108. The upper and lower wheel rim portions 1102 retract and behave in the same manner as the wheel rim 402 illustrated in FIG. 4. A benefit of this configuration is that during an emergency, in which driver take-over is necessary, the yoke portions 1104 may be used for steering purposes alone, rather than necessitating the reverse transformation/mating of the steering wheel parts before the driver is able to control the vehicle.

Figure 12:
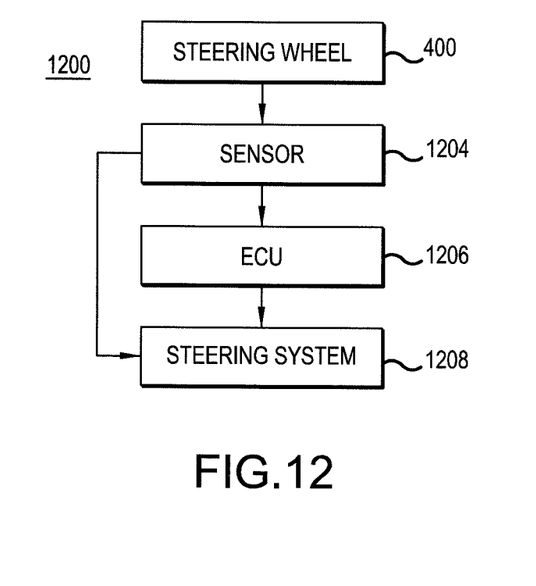
FIG. 12 illustrates a system 1200 incorporating the steering wheel 400 according to certain exemplary embodiments of the present invention.

FIG. 12 illustrates a system 1200 incorporating the steering wheel 400 according to certain exemplary embodiments of the present invention. The steering wheel 400 is connected to a steering sensor 1204 configured to detect the movement of the steering wheel 400 and transmit a corresponding command to the steering system (e.g., steer-by-wire system) 1208. In the manual driving mode, the steering sensor 1204 is configured to transmit the command directly to the steering system 1208. In the autonomous driving mode, however, the steering sensor 1208 transmits a command to the autonomous electronic control unit (ECU) 1206, which then controls the operation of the steering system 1208.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A steering wheel, comprising:
   a wheel rim movably mounted on a steering column;
   a hub disposed within a center of the wheel rim on the steering column; and
   an input device disposed on the hub,
   wherein the wheel rim is configured to physically separate from the hub and move along the steering column to a retracted position.

2. The steering wheel according to claim 1, wherein the steering wheel is configured to change from a first operating state to a second operating state based on a driving mode of a vehicle in which the steering wheel is incorporated.

3. The steering wheel according to claim 1, wherein the wheel rim is configured to move to the retracted position when a vehicle, in which the steering wheel is incorporated, enters an autonomous driving mode.

4. The steering wheel according to claim 3, wherein, during the autonomous driving mode, the wheel rim is configured to rotate in accordance with a driving motion of the vehicle while the wheel rim is in the retracted position.

5. The steering wheel according to claim 3, wherein, in the autonomous driving mode, the hub is configured to move forward, away from the wheel rim.

6. The steering wheel according to claim 3, wherein, in the autonomous driving mode, the hub is configured such that its position is maintained without rotating with the wheel rim.

7. The steering wheel according to claim 1, wherein the input device comprises an interactive touch screen disposed on each side of the hub.

8. The steering wheel according to claim 1, wherein the input device is configured to provide different input options based on a driving mode of the vehicle.

9. The steering wheel according to claim 8, wherein in a manual driving mode the input device is configured to control a limited set of vehicle functions.

10. The steering wheel according to claim 8, wherein in an autonomous mode the input device is configured to control an expanded set of vehicle functions.

11. The steering wheel according to claim 1, wherein the input device is mounted to the hub by a spring-loaded hinge.

12. A system, comprising:
an electronic control unit configured to control a driving mode of a vehicle; and
the steering wheel according to claim 1, the steering wheel being connected to the electronic control unit,
wherein the steering wheel is configured to change from a first operating state to a second operating state based on the driving mode of the vehicle.

13. A vehicle, comprising:
the steering wheel according to claim 1.

14. A steering wheel, comprising:
a dual-state input device configured to operate in two distinct states based on a current driving mode,
wherein in a manual driving mode the input device is configured to control a limited set of vehicle functions,
wherein in an autonomous mode the input device is configured to control an expanded set of vehicle functions, and
wherein the input device comprises a touch screen and a configuration of the touch screen is different in the manual driving mode than in the autonomous driving mode.

15. The steering wheel according to claim 14, further comprising:
a wheel rim; and
a hub disposed within the wheel rim,
wherein the dual-state input device is mounted to the hub.

16. The steering wheel according to claim 1, wherein the wheel rim is slidably mounted on a support shaft and is configured to move along the support shaft.

17. The steering wheel according to claim 1, wherein the wheel rim is slidably mounted on the steering column and is configured to slide along the steering column to the retracted position.

18. The steering wheel according to claim 1, wherein the retracted position is a position away from a driver.

19. A steering wheel, comprising:
a dual-state input device configured to operate in two distinct states based on a current driving mode,
wherein in a manual driving mode the input device is configured to control a limited set of vehicle functions,
wherein in an autonomous mode the input device is configured to control an expanded set of vehicle functions, and
wherein in the autonomous mode, the wheel rim is configured to disengage from the hub and move along the steering column to a retracted position.

20. A steering wheel, comprising:
a retractable steering tube;
a wheel rim movably mounted on the steering tube;
a hub mounted within the wheel rim on a stationary tube, the stationary tube extending from the retractable steering tube;
an input disposed on the hub; and
an actuator configured to retract and extend the retractable steering tube,
wherein the wheel rim is configured to physically separate from the hub and move to a retracted position in response to the steering wheel entering an autonomous driving mode.

* * * * *